United States Patent
Albaugh et al.

[11] Patent Number: 5,870,095
[45] Date of Patent: Feb. 9, 1999

[54] Z BUFFER INITIALIZE AND UPDATE METHOD FOR PIXEL BLOCK

[75] Inventors: Virgil Anthony Albaugh, Round Rock; Robert John Urquhart, Austin, both of Tex.

[73] Assignee: International Business Machines Corporation, Armonk, N.Y.

[21] Appl. No.: 109,572

[22] Filed: Aug. 19, 1993

Related U.S. Application Data

[63] Continuation of Ser. No. 624,163, Dec. 6, 1990, abandoned.

[51] Int. Cl.$^6$ ...................................................... G06F 15/00
[52] U.S. Cl. ............................ 345/422; 345/419; 345/421
[58] Field of Search ..................................... 395/118, 119, 395/121, 122; 345/419, 421, 422

[56] References Cited

U.S. PATENT DOCUMENTS

| | | | |
|---|---|---|---|
| 4,625,289 | 11/1986 | Rockwood | 364/522 |
| 4,697,178 | 9/1987 | Heckel | 340/729 |
| 4,808,986 | 2/1989 | Mansfield et al. | 340/747 |
| 4,812,988 | 3/1989 | Duthuit et al. | 364/522 |
| 4,825,391 | 4/1989 | Merz | 364/526 |
| 4,855,938 | 8/1989 | Gonzalez-Lopez et al. | 364/522 |
| 4,860,248 | 8/1989 | Lumelsky | 364/900 |
| 4,903,217 | 2/1990 | Gupta et al. | 364/521 |
| 4,907,174 | 3/1990 | Priem | 364/521 |
| 4,951,232 | 8/1990 | Hannah | 364/522 |
| 4,961,153 | 10/1990 | Fredrickson | 364/521 |

FOREIGN PATENT DOCUMENTS

| | | |
|---|---|---|
| 0300703 | 7/1988 | European Pat. Off. . |
| 8600454 | 6/1985 | WIPO . |

*Primary Examiner*—Huynh Ba
*Attorney, Agent, or Firm*—Mark E. McBurney

[57] ABSTRACT

A method is provided for initializing and updating a group of pixels contained on a display in blocks. A group of pixels is considered as a block and has a status word associated therewith. This status word maintains a running total of the maximum z value of any pixel contained within a group, or block of pixels. In this manner, once a block of pixels is rendered on to the display screen a comparison can be made between the current pixels being displayed and a group of pixels which are to be displayed. The minimum z value of the group of pixels to be displayed is compared with the maximum z value for the group of pixels currently being displayed. If the current maximum z value, as stored in the status word, is less than the minimum z value for the pixels to be displayed, then the group of pixels currently being displayed will all "win" when compared to the pixels in the group to be displayed. Thus, a full block bypass of the group of pixels to be displayed is implemented, thereby saving considerable time and overhead when compared to conventional z buffer systems that compare z values for each individual pixel.

14 Claims, 8 Drawing Sheets

```
1
2    // Input: scan line from (x, y1) => (x, y2)
3    // Parameters: x, y1, y2, z(x, y1), c(x, y1), delz, delc
4
5    // Expand y extent to a 32 bit boundary
6    y = integer(y1 / 32) * 32;
7
8    while(y <= y2) {
9        ystart = y;
10       yb = y / 32;   // za index
11
12       // Uninitialized block Algorithm
13       if(za(x, yb) < 0) {
14           za(x, ya) = 0;   // initialize block maximum
15
16           // BEFORE
17           while(y < y1) {
18               write_frame_buffer(x, y. BACKGRD);
19               zbuf(x, y) = ZMAX;
20               za(x, yb) = ZMAX;
21               y++;
22           }
23
24           // DURING
25           ystop = min(ystart + 32, y2);
26           while(y < ystop) {
27               write_frame_buffer(x, y, c);
28               zbuf(x, y) = z;
29               za(x, yb) = max(za(x, yb), z);
30               c += delc;
31               z += delz;
32               y++;
33           }
34
35           // AFTER
36           while(y < ystart + 32) {
37               write_frame_buffer(x, y, BACKGRD);
38               zbuf(x, y) = ZMAX;
```

© IBM Corp., 1990

FIG. 5A

```
39              za(x, yb) = ZMAX;
40              y++;
41          }
42      } // end uninitialized block algorithm
43
44      // Initialized block algorithm
45      else {
46          // scan line minimum in this block
47          if(delz > 0)  zest = z;
48          else zest = z + 32 * delz;
49
50          if(zest > za(x, yb)) {  // bypass block
51              if(y1 < y) {  // full block bypass
52                  y += 32;
53                  c += 32 * delc;
54                  z += 32 * delz;
55              }
56              else {  // partial block bypass
57                  while(y < ystart + 32) {
58                      y++
59                      c += delc;
60                      z += delz;
61                  }
62              }
63          } // end of block bypass
64
65          else {  // need to scan convert
66              za(x, ya) = 0;  // initialize block maximum
67
68              // BEFORE
69              while(y < y1) {
70                  if( zbuf(x, y) > za(x, yb) ) za(x, yb) = zbuf(x, y);
71                  y++;
72              }
73
74              // DURING
75              ystop = min(ystart + 32, y2);
```

© IBM Corp., 1990

FIG. 5B

```
76          while(y < ystop) {
77              if(z < zbuf(x, y) ) {
78                  write_frame_buffer(x, y, c);
79                  zbuf(x, y) = z;
80              }
81              if( zbuf(x, y) > za(x, yb) ) za(x, yb) = zbuf(x, y);
82              c += delc;
83              z += delz;
84              y++;
85          }
86
87          // AFTER
88          while(y < ystart + 32) {
89              if( zbuf(x, y) > za(x, yb) ) za(x, yb) = zbuf(x, y);
90              y++;
91          }
92      } // end of block scan convert
93
94    } // end of initialized block algorithm
95
96 } // end of scan line while
97
```

© IBM Corp., 1990

FIG. 5C

Z BUFFER INITIALIZE AND UPDATE METHOD FOR PIXEL BLOCK

This is a continuation of application Ser. No. 07/624,163 filed Dec. 6, 1990 abandoned.

BACKGROUND OF THE INVENTION

This invention relates generally to computer graphics systems and more specifically to initialization and updating of a display z buffer. The z buffer is a depth buffer which holds a value associated with the depth of each pixel on a display screen and is generally used to remove hidden surfaces or lines when rendering 3-D solids on a display. Conventional z buffers include one word associated with each displayed pixel. The present invention is a method of improving both the initialization and updating functions associated with the z buffer. More particularly, pixels are grouped together in blocks and a status word (za) is associated with each block. This status word contains the maximum value of any pixel within the block. It should be noted that maximum value refers to maximum depth of a pixel within a display screen, i.e. the maximum distance from the eye of a viewer to the pixel.

Conventional z buffers initialize each pixel position individually when clearing the z buffer, and updating the z buffer for new values. That is, at initialization each pixel is set to a z max value such that any new z value will be closer to a viewer of the display than the z max value. Therefore, any subsequent z value will "win" when compared to z max.

To update the z buffer of conventional systems, the existing value in the z buffer for each pixel is compared with the new z value to be written to the same pixel. If the new z value is less than the value currently in the z buffer for that pixel, then the new z value replaces the existing value in the z buffer. In this manner, pixels representing objects closer to a viewer of the display are maintained in the z buffer and objects further from the viewer are obscured. If the existing value in the z buffer is less than the new value for the object being displayed then the existing value remains in the z buffer. This procedure is applied to each pixel of each scan converted object until the entire scene is rendered.

SUMMARY OF THE INVENTION

In contrast to the prior art, the present invention sets the za word to a maximum z value (z max) such that subsequent z values for each pixel in the block associated with za will win (be displayed) when compared with each pixel in the block under consideration. In other words, instead of setting each pixel to z max only the za word is set to z max and all of the pixels in that block are considered to be initialized to z max. In this manner significant time and overhead is saved when initializing a z buffer. These za words are initially set to a negative value which indicates that the block has been "logically cleared," which means that actual z values have yet to be determined and written to the z buffer. The present invention utilizes a method which eliminates the need to apply a comparison between a new z value and an existing z value for each individual pixel on a display screen.

BRIEF DESCRIPTION OF THE DRAWINGS

FIGS. 5A, 5B and 5C are is a listing of pseudo-code which is an example of one means of implementing the present invention.

DETAILED DESCRIPTION OF THE PREFERRED EMBODIMENTS

Figure 1:
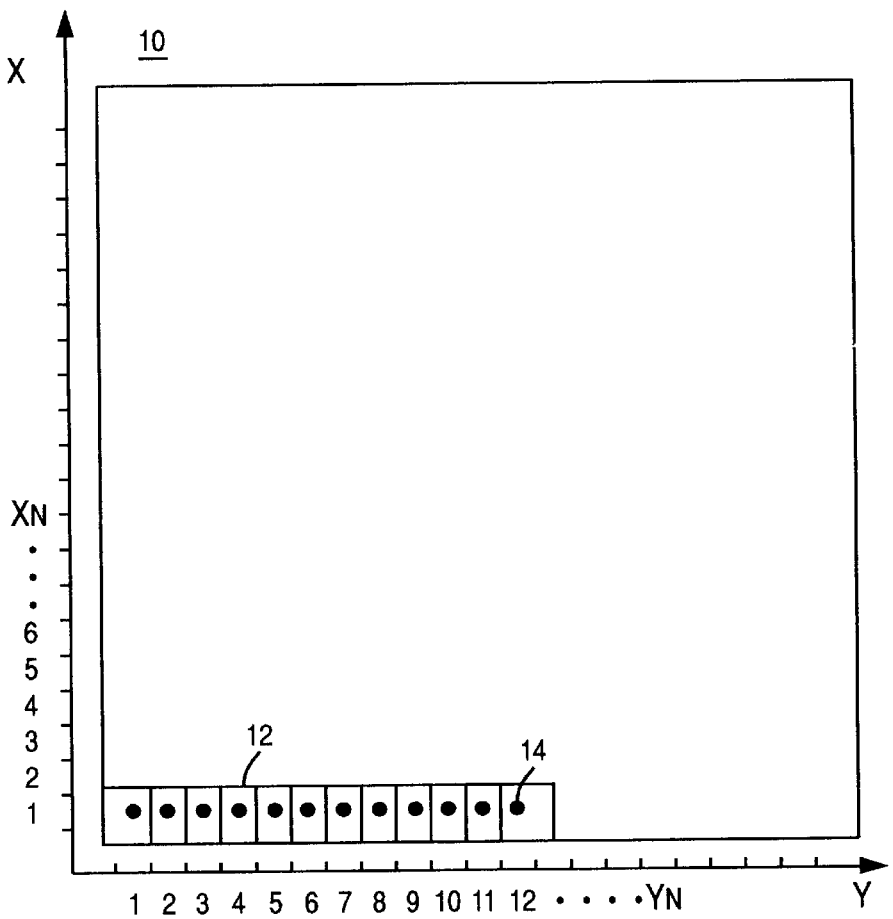
FIG. 1 shows a display having an associated block of pixels.

Referring to FIG. 1, a display monitor 10, such as a cathode ray tube (CRT), or the like is shown. Display 10 includes a plurality of pixels which when illuminated define an image being displayed. The number of pixels contained on display 10 will vary depending on the resolution of the display. With regard to display 10, Yn×Xn pixels are included, where Yn and Xn are positive numbers which may vary from approximately 400 to 1024. A block 12 including, for example, 12 pixels (reference numeral 14) is also shown in FIG. 1. This group of pixels is representative of a block which will have a status word associated therewith.

Figure 2:
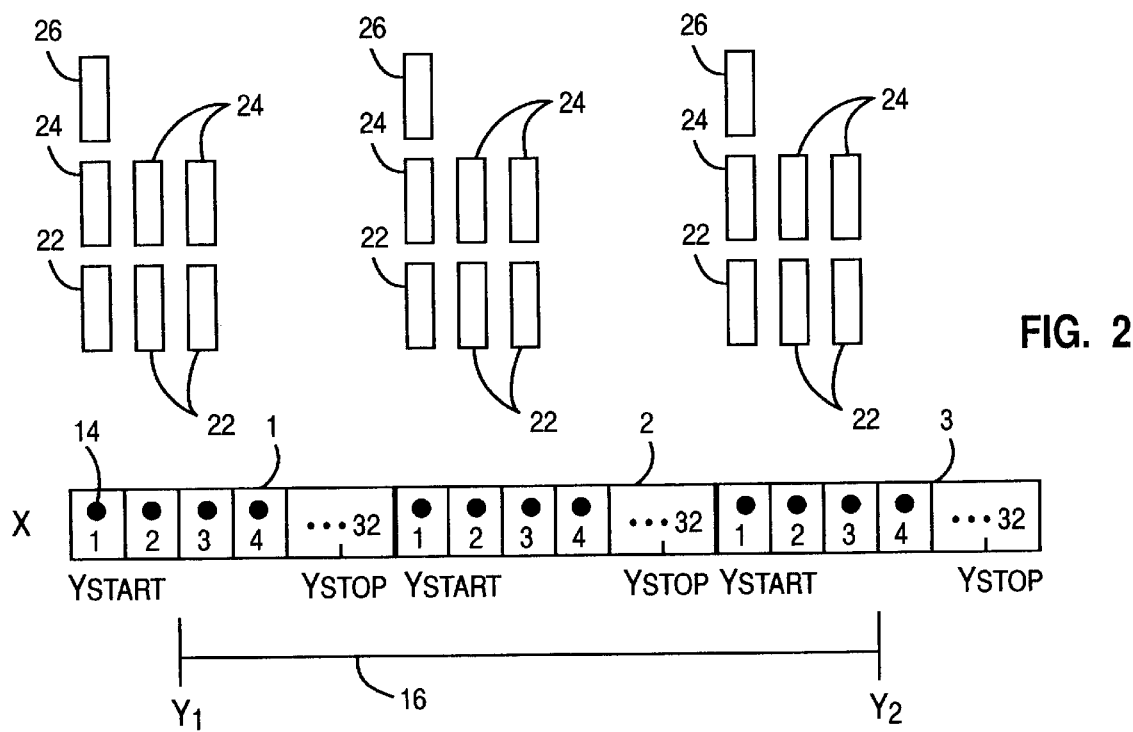
FIG. 2 is a portion of a display and illustrates three blocks of pixels and a line which intersects a number of the pixels contained within each of these three blocks.
Figure 6:
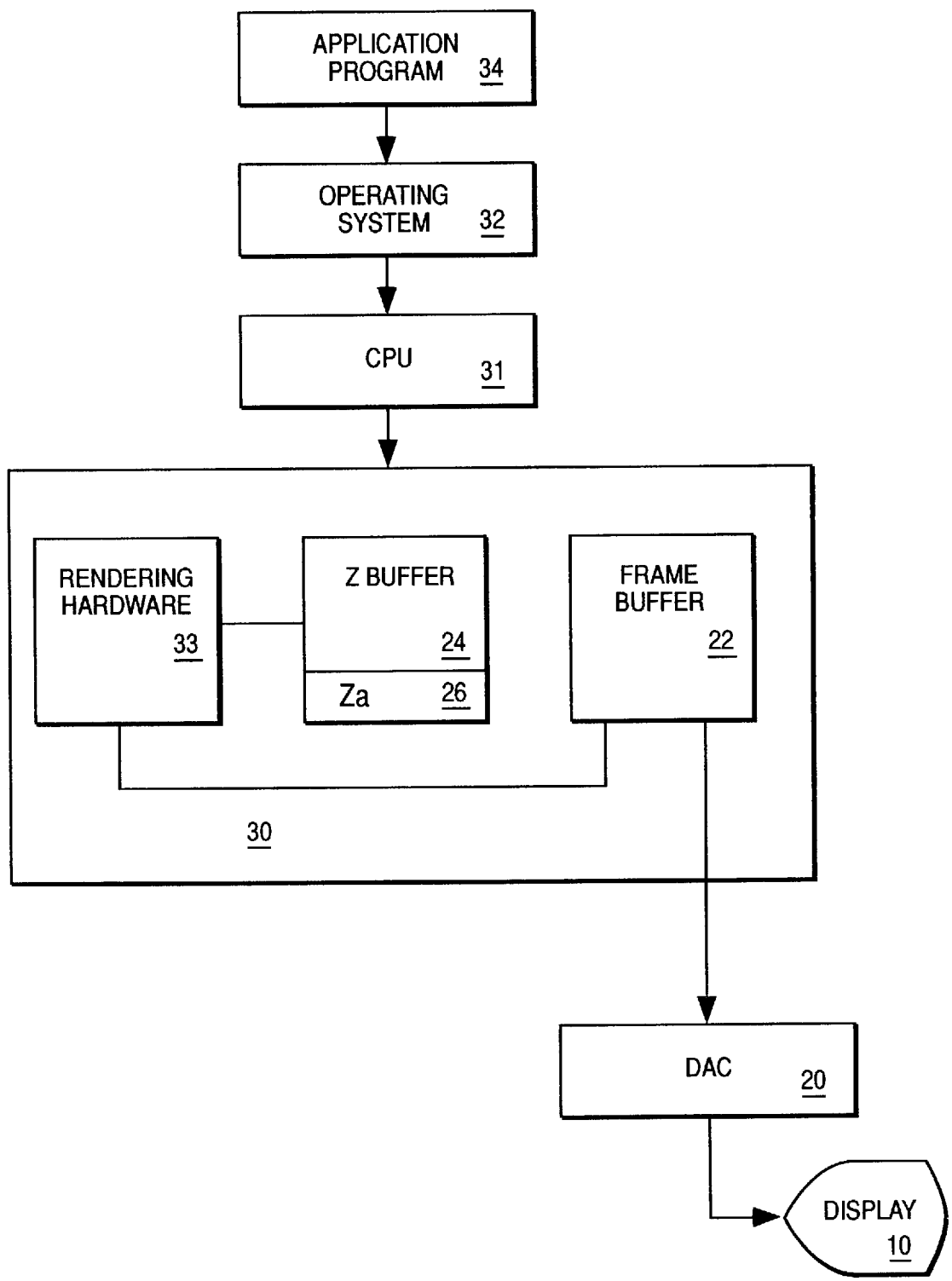
FIG. 6 is a schematic diagram showing a computer graphics system on which the present invention may be implemented.

FIG. 2 illustrates three separate blocks of pixels 14, of display 10, similar to block 12 described with reference to FIG. 1. Blocks 1,2,3 each include 32 pixels 14 and are adjacent to one another. For convenience, only the first four pixels and the last pixel (32nd) of each block are shown. Additionally, the frame buffer 22, z buffer 24 and za buffer 26 for each block are schematically illustrated in FIGS. 2 and 6. In addition to a z-buffer and frame buffer, the present invention utilizes a za buffer which is a memory capable of storing status information corresponding to each block of pixels. That is, a memory capable of storing a z value for each block of pixels must be provided either by additional memory, or utilization of existing unused memory. It can be seen that the za buffer must be able to store at least one z value for each block of pixels, where the number of blocks will be equal to the number of pixels on the display divided by the number of pixels per block. The understanding of the present invention, in particular the function of the status word za in maintaining the maximum z value for the block, will be facilitated when FIG. 2 is taken in conjunction with the following description.

These blocks of pixels will be described as a group of linear pixels along a scan line. However, any block of pixels can be utilized, e.g. if the screen has x rows and y columns then the status word (za) has x/number of pixels per row and y/number of pixels per column. This description will use 32 pixels per block, arranged linearly and parallel to the y axis of a Cartesian coordinate system. It should be noted that in practice the number of pixels per block will be selected to maximize performance based on criteria such as cost and hardware utilization. Of course, any number of rows and columns can be used and the pixels do not have to be arranged linearly.

Additionally, in FIG. 2, a line 16, (Y1–Y2) is shown which begins within block 1 and ends in block 3. Thus it can be seen that line 16 includes pixels within each of blocks 1,2,3.

The process of the present invention will now be described with reference to FIGS. 3a,3b, in conjunction with FIG. 2. For the purposes of describing the present invention, an example will be used wherein line 16 is to be drawn through the pixels 14 of blocks 1,2,3, as shown in FIG. 2. It should be noted that the present invention contemplates other possible configurations of lines and surfaces to be drawn, as well as other configurations of blocks of pixels.

At step 1, the parameters of the block being considered must be initialized. In this example, the Y values must be extended along the scan line such that all pixels to be drawn as line 16 are considered consecutively, independent of the number of blocks 1,2,3, or the like which may contain the line. For example, in blocks 1,2,3 as shown in FIG. 2 the Y value is initially set to correspond to the first pixel in the block containing the beginning of the line being drawn, Y1. In this case, Y1 corresponds to the third pixel in block 1 and Y2 corresponds to the third pixel in block 3. The line to be drawn between Y1 and Y2 includes all of the pixels contained in block 2. In order to process this line three blocks of pixels need to be considered. First, those pixels contained within a first adjacent block (in this case block 1) including those pixels which occur prior to the beginning of the line being drawn, i.e. Y is less than Y1 (pixels 1,2 of block 1), and those pixels lying within the line to be drawn, i.e. where Y is greater than Y1 but less than Y2 (pixels 3–32 of block 1). Second, pixels 1–32 of block 2 must be considered when drawing line 16. Third, the pixels of block 3 must also be considered including those pixels associated with line 16 (pixels 1–3), and those pixels not associated with the line, but contained within one of the blocks which has at least one pixel within line 16, i.e. pixels where Y is greater than Y2 must also be considered (in this case pixels 4–32 of block 3).

Additionally at step 1, Ystart is set at the left, or beginning pixel of the block being considered, i.e. Ystart equals the left most pixel in each block. Further, Ystop is defined as Ystart plus the number of pixels in the block minus one. In this case, since Ystart is equal to pixel 1, then Ystop equals pixel 32. Of course, any number of pixels can be used for the blocks, but 32 was chosen to exemplify the present invention and should not be considered a limitation. For example, if Ystart equaled one, and 20 pixels were included in the block, then Ystop would be the 20th pixel.

Step 2 considers the pixels belonging to an intersected block being drawn, i.e. all pixels of a block having any pixels which are intersected by line 16. If Y is not less than or equal to Ystop, then the pixels cannot be included in the block under consideration and the method proceeds to step 10 and ends. It should be noted that Ystart is defined as being the first pixel in each block of pixels being considered. Additionally, Ystop is considered the last pixel in each block. In the example utilized with the description of the present invention, pixel 32 of block 1, pixel 32 of block 2 and pixel 32 of block 3 are each designated as Ystop (see FIG. 2). Also, as previously noted Y1 and Y2 are equal to the end points of the line being drawn, in this case the beginning point and end point of line 16 (Y1 is pixel 3 of block 1 and Y2 is pixel 3 of block 3). The importance of these definitions, as shown on FIG. 2, will become apparent during the following description of the present invention as embodied in the flowcharts of FIG. 3a and 3b.

At step 3 it is determined whether the block under consideration is initialized or uninitialized. That is, a determination is made as to whether the pixels contained within the block have previously been written to with a z value or are "logically cleared," i.e. meaning za for the block has a negative value. Specifically, has the z value for the status words za for each block been set to a negative value thereby indicating the uninitialized nature of the block of pixels? It should be noted that all blocks having at least one pixel contained in the line being drawn are considered by the flowchart of FIGS. 3a and 3b independently of the remaining blocks (subsequently considered) contained on the display 10 regardless of whether a line or surface to be drawn extends into other blocks.

Figure 3A:
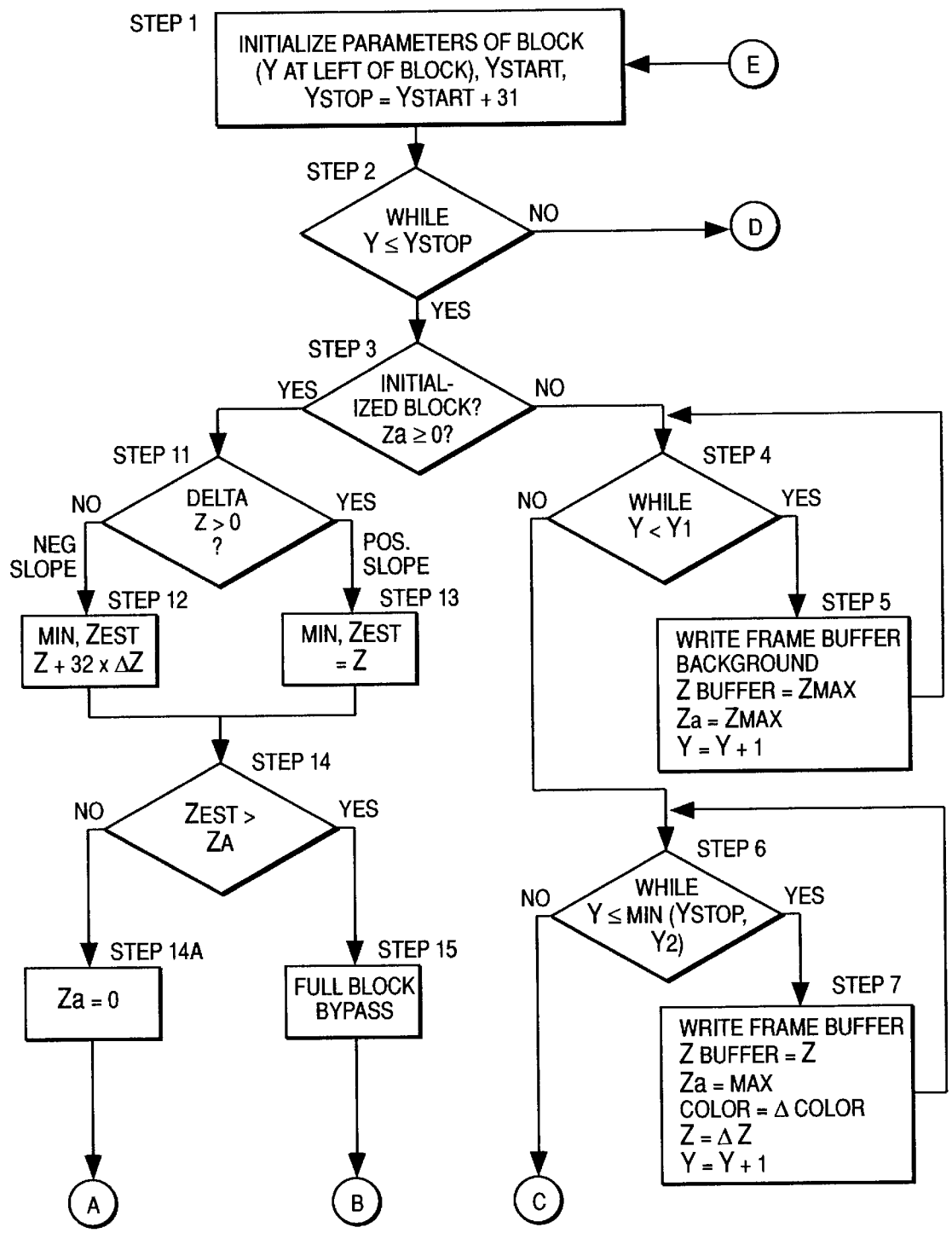
FIGS. 3A and 3B are is a flow charts representing the process utilized by the present invention to initialize and update a z buffer.
Figure 3B:
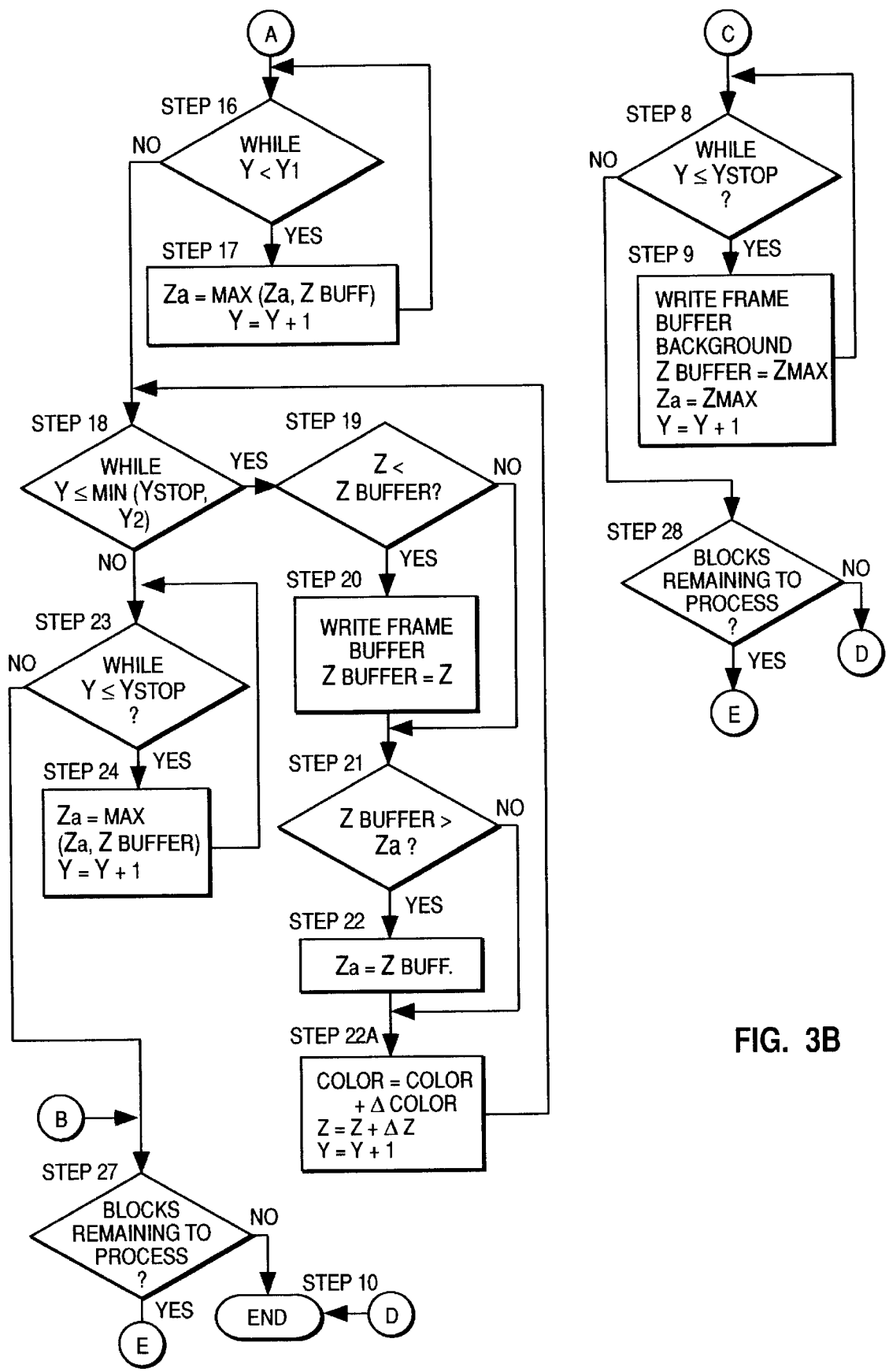

Again, for the purpose of this discussion blocks 1, 2 and 3 and line 16 of FIG. 2 will be considered in conjunction with the flowchart of FIGS. 3a and 3b. First it will be assumed the blocks 1, 2 and 3 are uninitialized and during the processing of block 1 the present invention continues to step 4 which determines whether the Y value is less than Y1, which is the starting point of line 16. It can be seen that pixels 1 and 2 of block 1 satisfy step 4 and the method proceeds to step 5 where the frame buffer for the pixel being considered is written to a background color (since the line has not started) and the z buffer and status word (za) for the block are set equal to the z max value. Thus, the z buffer for the pixel now contains a value such that it is initialized. The status word za is also set to z max such that a "running total" of the maximum z value encountered for the pixels in this block is kept. It should also be noted that steps 4 and 5 are looped together by incrementing Y at step 5, i.e setting Y equal to Y plus one. In this manner, each pixel is considered successively and steps 4 and 5 are continuously repeated while the requirements of step 4 are met.

When Y corresponds to pixel 3 of block 1 it can be seen that Y is no longer less than Y1 and the method proceeds to step 6 where it is determined whether Y is less than or equal to the minimum of Ystop or Y2. Ystop is the last pixel in the block under consideration (block 1), and Y2 is the last pixel in the line being drawn. In this case, Ystop for block 1 is the 32nd pixel of block 1. Therefore, it can be seen that step 6 will be satisfied for pixels 3–32 of block 1, i.e. Y will be less than or equal to Ystop for these pixels. For each pixel where the requirements of step 6 are satisfied, the present invention proceeds to step 7 where the frame buffer for the first pixel considered is set with a color value (for the line being drawn), the z buffer is set with the z value for the line being drawn and status word za is set to the maximum of the current za value or the current z value such that the running total of the maximum z value for the block is maintained. For each subsequent pixel considered, the frame buffer is set to the color value of the previous pixel, plus a delta color value, determined through interpolation, or the like. That is, the frame buffer for each subsequent pixel is set to a color value equal to the previous color value plus the delta color value. Similarly, the z buffer for subsequently considered pixels is set to z (for the previous pixel) plus a delta z value, also determined through interpolation. It can be seen that for the first pixel in each block delta color and delta z will be equal to zero. Therefore, for the first pixel the z buffer is set equal to the z value and the frame buffer for the first pixel is set equal to the color value. Once again, Y is incremented by setting it equal to Y+1 and steps 6 and 7 are repeated for each pixel which satisfies the requirements of step 6 (in this case pixels 3–32 of block 1), i.e. the process loops between steps 6 and 7 during the time when Y is less than or equal to the minimum of Ystop, or Y2.

When Y is no longer less than or equal to the minimum of Ystop, or Y2, the method proceeds to step 8 of FIG. 3b which determines whether Y is less than or equal to Ystop, which was defined with regard to step 1. In the current example, the last pixel of block 1 (pixel 32) has been processed, at step 7, and Y has been incremented such that Y=Y+1 is not less than Ystop, see step 8 and FIG. 2. Therefore, the method of the present invention continues to step 28 which determines if blocks are remaining to be processed and if so, the method returns to step 1. It can be seen that block 1 of FIG. 2 has been processed and pixels 1 and 2 have been written with the background color while pixels 3–32 have been written with the line color. Additionally, the status word za for block 1 has been set to the maximum z value which corresponds to any of the pixels 1–32 of block 1. That is, za is set equal to the maximum z value for any one of the pixels in the block.

Step 1 initializes Ystart for the next block to be considered (block 2) and step 2 determines if Y is less than or equal to Ystop. Step 3 then determines whether the next block to be processed (block 2) is initialized or uninitialized. Again, assuming that block 2 is uninitialized for the purposes of this example, the present invention proceeds to step 4 which then determines if Y is less than Y1. In this case, for block 2, Y is the first pixel in block 2 and as can be seen from FIG. 2, Y is not less than Y1. The method then proceeds to step 6 which determines if Y is less than or equal to the minimum of Ystop, or Y2. Again referring to FIG. 2, it can be seen that Y is in fact less than or equal to the minimum of Ystop (pixel 32 of block 2), or Y2. The method then continues to step 7 where the status word za for block 2 is set to the maximum value of z, to begin keeping the running total of maximum z values for the block. For the first pixel in block 2, za will be set to the z value of pixel 1 and during consideration of subsequent pixels the status word za will be set with the maximum of its current value, or the z value for each pixel satisfying step 6. Additionally, the frame buffer is set to the line color determined by the delta color (color=color+delta color), z is set equal to the z value determined by delta z (z=z+delta z) and the z buffer is set equal to z (z buffer is effectively set to z+delta z). The pixel being considered is then incremented by Y=Y+1 and iterations between steps 6 and 7 will continue so long as the pixels being considered within block 2 satisfy step 6. Therefore, it can be seen that all of the pixels within block 2 are less than or equal to the minimum of Ystop, or Y2 and each pixel within block 2 will undergo the operations set forth in step 7. After pixel 32 of block 2 is processed at step 7 the method returns to step 6 to where it is then determined that Y is no longer less than or equal to the minimum of Ystop, or Y2 since all of the Y values corresponding to the pixels in block 2 have been processed. The method then proceeds to step 8 where it is determined that Y is not less than Ystop and the method continues to step 28 and once again returns to step 1. Thus, after processing of block 2 it can be seen that the status word za for block 2 is set to the maximum z value encountered for any one of the pixels 1–32 contained by block 2, and that each of the pixels 1–32 have been written with the line color for line 16.

Once again steps 1 and 2 initialize and determine if Y is less than Ystop, respectively. Step 3 then determines whether the next block to be processed, in this case block 3, is initialized or uninitialized. Again, assuming that block 3 is uninitialized the process continues to step 4 where it is determined that Y is not less than Y1, as can be seen in FIG. 2. The method then proceeds to step 6 where it is determined if Y is less than or equal to the minimum of Ystop or Y2. It can be seen from FIG. 2 that pixels 1, 2 and 3 of block 1 are in fact less than or equal to Y2 and the frame buffer for each of these pixels is written with the line color (color=delta color), the status word za for block 3 is set to the maximum z value corresponding to any one of pixels 1–3 of block 3, the z buffer is set to the z value of each pixel, as determined by delta z, and the z value is set equal to the z+delta z (the delta z value being the change between the z value for the previous pixel being considered and the current pixel being considered) such that for each subsequent pixel, the z buffer will be set to z+delta z. Again, steps 6 and 7 are looped and incremented by Y=Y+1 for each pixel satisfying the requirements of step 6. When pixel 4 is encountered, it can be seen that Y is no longer less than or equal to the minimum of Ystop, or Y2 since Y2 corresponds to pixel 3 of block 3, i.e. the last pixel corresponding to the line being drawn. Therefore, the present invention continues to step 8 where it is determined if Y is less than or equal to Ystop. The 4th pixel of block 3 is less than Ystop, i.e. 4 is less than 32. Therefore, the process continues to step 9 where the frame buffer for pixel 4 is written to the background color, the z buffer is set to the z max value and za is also set to the maximum z value for any pixel in the block, thereby keeping a running total of the maximum z value for the entire block. Once again, steps 8 and 9 are looped and each pixel satisfying the requirements of step 8 is incremented. In this case pixels 4–32 of block 3 are consecutively processed by steps 8 and 9 until step 8 is no longer satisfied. Once pixel 32 of block 3 is processed and incremented by Y=Y+1, then step 8 is no longer satisfied, since the next pixel is included in a different block, and the process continues to step 28 where it is determined if there are any blocks to process. If so, the process returns to step 1 and the next block is initialized. If there are no blocks remaining to process then the the method of the present invention proceeds to step 10 and ends.

Next, an example of the configuration shown in FIG. 2 will be described wherein the blocks have previously been initialized. For example, blocks 1, 2 and 3 are now considered to be initialized since they have been processed as described above. Assuming that blocks 1, 2, and 3 have been initialized the present invention must set the parameters of the block (Y to the left of the block at Ystart) again at step 1. It is then determined whether Y is less than or equal to Ystop at step 2 and if so, the process continues to step 3. If however, Y is not less than or equal to Ystop the present invention continues to step 10 and ends. Next, at step 3 it is determined whether the blocks are initialized. For the purposes of this example, it will be assumed that blocks 1, 2 and 3 of FIG. 2 have been initialized, as previously discussed. When considering block 1, it can be seen that the method of the present invention will proceed to step 11 where it is determined if delta z is greater than 0, i.e. if the slope of the line representing the depth values of pixels in the block is away from the front of the screen (line 1, FIG. 4). A positive slope (delta z greater than zero) will indicate that the line to be drawn is getting deeper into the screen when considered from left to right (line 2, FIG. 4). Lines 1 and 2 are representations of depths value for pixels in a block on a coordinate system where the z axis represents depth and the y axis is the position of the pixel in the bLock. A negative slope (delta z is less than zero) means that the line being drawn is becoming shallower as considered from left to right (line 2, FIG. 4). An estimate of the minimum z value in the block for the line to be drawn is then calculated at steps 12, 13. If delta z is positive then the present invention proceeds to step 13 and the minimum estimated value of z for the line is merely the initial z value (e.g. zmin1, FIG. 4), since the z value of successive pixels will increase, i.e. be farther from the front of the screen. If delta z is negative, an estimate is made of the minimum z value for any pixel in the block. Since, in this case, a block contains 32 pixels, the minimum possible z value for any pixel in the block is the initial z value (zmax2, FIG. 4) of the first pixel in the block (that is contained within the line) plus the delta z value, multiplied by 32 (number of pixels in a block) which yields zmin2, or zmin2=zint+32×delta z. Thus, it can be seen that for lines to be drawn having a positive slope (line 1, FIG. 4) the left most pixel, (zmin1) will be the minimum z value of the line. But, for lines with a negative slope, the minimum z value (zmin2, line 2, FIG. 4) must be calculated.

Figure 4:
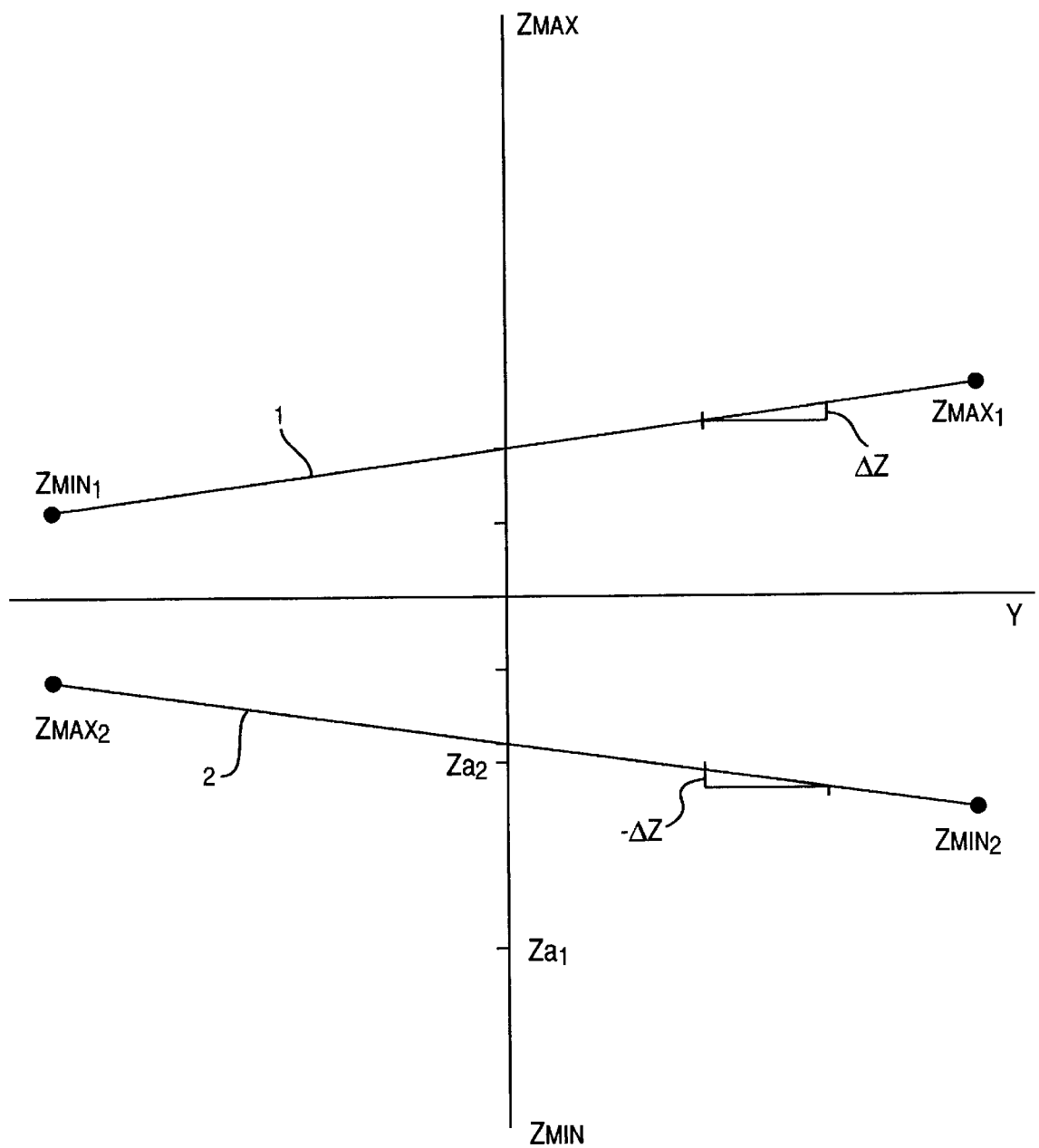
FIG. 4 is a graphical representation of the slope of a line being drawn and its comparison with the status word za.

Subsequent to steps 12 and 13 the process continues to step 14 where it is determined if the estimated z value is greater than the z value within the status word za for the block being considered. It should be recalled that za is a representation of the maximum z value for any pixel within the block and z estimate is a representation of the minimum possible z value of any pixel in the line being drawn. Comparing these values determines if there is a possibility that part of the line is visible within the block, or if all of the line is "hidden" by the block. Step 14 addresses the hidden line/hidden surface aspect of the present invention. It can be seen that if the estimated minimum z value for the block of pixels including the line to be drawn, which was determined at steps 12 and 13, is greater than the status word za (maximum z value) for the block of pixels which have been previously initialized (written to), then all of the pixels in the line currently being drawn have a z value greater when compared to the value of the status word za of the previously initialized block of pixels. Therefore, the pixels representing the line currently being drawn, and contained within the block currently being considered, are obscured from view by the pixels already contained in the previously initialized block (see FIG. 4). For example, zmin1 and zmin2 of FIG. 4 are maximum when compared to za. Thus, a full block bypass of the pixels of line 1 would be implemented during processing of lines 1 and 2, given the value of za as shown in FIG. 4, since all of the pixels of line 1 are obscured by the pixels of line 2, i.e. each pixel of line 1 has a greater z value than the maximum z value of any pixel of line 2. In this case, a full block bypass is implemented at step 15. That is, all of the pixels in the block associated with the status word za are considered to be closer to a viewer than the pixels in the block having the line currently being drawn and corresponding to the previously determined estimated z value. Therefore the previously initialized block of pixels are considered to "win" and be visible to a viewer of display 10. In a full block bypass it is necessary to advance the color and z value of the line to their initial values at the beginning of the next block. It can be seen that implementation of a full block bypass will increase the processing speed, as well as reduce overhead associated with a pixel by pixel comparison of z values. That is, a single comparison, at step 14, (z estimate greater than za?) may allow a total of 32 pixels (in this example) to be processed. If a full block bypass is implemented the method then proceeds to step 27 where it is determined if there are blocks remaining to process and if so the method returns to step 1. If there are no blocks remaining to process at step 27 then the method ends at step 10.

If at step 14 the estimated minimum z value is not greater than the status word za for the previously initialized block, then a comparison of the z values at each pixel location must be implemented and is addressed by steps 14A–24 of the flowchart of FIG. 3b. Referring to FIG. 4, za2 is not less than zmin2 and it can be seen how a full block bypass cannot be implemented with respect to line 2. In this case a pixel by pixel comparison must be undertaken. In step 14A, the status word is set equal to zero because a new maximum value will have to determined for this block, which will occur during subsequent processing of the pixels at steps 16–24.

It can be seen that step 16 is analogous to step 4 and considers those pixels of the block being processed where Y is less than Y1, see FIG. 2. For example, pixels 1 and 2 of block 1 satisfy step 16, since Y is in fact less than Y1. While y is less than Y1, the method proceeds to step 17 where the status word za is set equal to the maximum of the current value of za, or the z value within the z buffer corresponding to that pixel. It should be noted that for the initial pixel being processed at step 17, za will equal zero and be set to the z buffer value. For subsequent pixels a comparison between za and the z buffer will occur. Again, steps 16 and 17 are looped such that each of the pixels satisfying the requirements of step 16 are incremented by Y=Y+1 and consecutively processed. Once pixel 3 of block 1 is encountered then step 16 is no longer satisfied and the process continues to step 18 which is analogous to the previously described step 6, i.e. is Y less than or equal to the minimum of Ystop or Y2. Step 18 will be satisfied for pixels 3–32 of block 1 and the present invention then continues to step 19 where a comparison for each pixel is made. That is, a determination is made of whether the z value currently stored in the z buffer, for each pixel, is greater than the new z value for the line being drawn. If step 19 is satisfied, i.e. z is less than the value in the z buffer, the pixel is visible and frame buffer and z buffer must be written with the new z value at step 20.

At step 21 it is determined whether za needs to be updated because of the new value in the z buffer. If the value in the z buffer is greater than za, then za is set equal to the new maximum value in the z buffer at step 22. At step 22A the color and z value of the next pixel is computed based on the interpolated value given by the delta color and delta z, as previously discussed.

Subsequent to step 22A the process returns to step 18 which determines whether the next pixel in the block is less than or equal to Ystop, in a manner as previously discussed.

It can be seen that step 18 will address pixels 3–32 of block 1 until all of the pixels in block 1 have been processed. At that time, the method will proceed to step 23 and since all the pixels in block 1 have been processed, i.e. pixel 32 is not less than Ystop, then step 27 determines whether there are blocks remaining to process and if so returns to step 1, or ends at step 10. Since, for this example, there are blocks remaining to process (blocks 2 and 3 of FIG. 2), the method returns to step 1 and initializes block 2, step 2 determines whether Y is less than or equal to Ystop and step 3 determines that block 2 has in fact been initialized. Steps 11–13 then determine an estimated z value for the pixels in block 2, as previously discussed. Step 14 then compares the determined z estimate with the status word za for block 2, which has been previously set to a maximum value in step 7. If a full block bypass is possible then the method continues to step 27 to determine if there are blocks remaining to process. If a full block bypass is not possible then step 16 determines if Y is less than Y1 which will not be the case for block 2, since all the pixels contained therein are associated with line 16. Therefore, the process continues to step 18 which addresses those pixels with Y values that are less than or equal to the minimum of Ystop or Y2, which will include all of the pixels of block 2. Steps 18, 19, 20, 21, 22 and 22A are looped (incremented by Y=Y+1) and each pixel in block 2 will be consecutively addressed by steps 18–22A in a manner as previously described. Once, pixel 32 of block 2 is processed the method proceeds back to step 18 and on to step 23 since Y has been incremented by Y+Y=1, therefore Y is not less than Ystop. Again, step 27 then determines if any blocks are remaining to process and returns the process to step 1 for initialization of block 3.

Step 1 initializes block 3, step 2 determines if Y is less than or equal to Ystop and step 3 determines that block 3 has previously been initialized. Again, steps 11–13 calculate an estimated z value and step 14 determines if a full block bypass is possible. Assuming that a full block bypass is not possible for block 3, the method of the present invention continues to step 16 where it is determined that Y is not less than Y1 and proceeds to step 18. It can be seen that for pixels 1–3 of block 32 step 18 will be satisfied and these pixels will be processed by the looped steps 18–22A as previously discussed. Once, pixel 4 is encountered step 18 is no longer satisfied and the present invention proceeds to step 23, which is similar to step 8, and determines if Y is less than or equal to Ystop. It can be seen that for pixels 4–32 of block 3, step 23 will be satisfied and the status word for block 3 will be set equal to the maximum of the value contained in the z buffer, or the value currently in the status word za, whichever is greater. Thus, it can be seen that za will contain the maximum value (running total) for any z value encountered with regard to any pixel contained in the block. Once again, steps 23 and 24 are looped and each pixel satisfying step 23 contained within block 3 will be consecutively processed at step 24. Once the last pixel in block 3 (pixel 32) has been processed and incremented by Y=Y+1, then Y will no longer be less than or equal to Ystop and the method of the present invention proceeds to step 27 which determines if there are any blocks remaining to process. It can be seen that for the currently described example all of the blocks of FIG. 2 have in fact been processed and the present invention will continue to step 10 and end.

FIGS. 5A and 5B list pseudo-code which exemplifies one means of implementing the present invention. One skilled in the art will appreciate the simplicity of the present invention when the pseudo-code is viewed in conjunction with the flowchart of FIGS. 3A and 3B.

FIG. 6 is a computer graphics system which may utilize the z buffer initialize and update method of the present invention. A display, or monitor 10, such as a CRT, or the like is shown with digital to analog convertor (DAC) 20 providing a signal to be displayed thereon. Frame buffer 22, z buffer 24 and its associated status word (za) 26 are all shown and may be included on a graphics adapter card 30, or the like, which also includes the rendering hardware 33. A central processing unit (CPU) 31 is provided along with operating system 32, which will contain the actual lines of programming code to be used by the present invention to more efficiently initialize and update display 10. Finally, an application program 34 is shown that determines the surfaces and the lines to be displayed on monitor 10.

The present invention contains several advantages over conventional z buffer display systems. For example, less time and overhead is required to initially set the z values since only the status word za for a block of pixels needs to be cleared. Conversely, conventional systems must clear each and every pixel individually. Therefore, rendering an object on the display can begin with less delay, thereby improving the efficiency of z buffer initialization. Additionally, in complex scenes that are often rendered by graphics systems many objects may be hidden by other previously scan converted objects, such as lines and surfaces. The present invention provides a means of comparing, through a status word za, a plurality of pixels which have previously been drawn to the display with a plurality of pixels that are to be drawn to the display. This comparison matches the maximum z value for the currently drawn pixels with the minimum value for the group of pixel to be displayed and determines whether the currently displayed pixels will win. If so, the currently displayed pixels will remain on the display and another group of pixels to be drawn can then be processed. It can be seen, how comparing two groups of pixels with one another saves a great deal of time and overhead when compared with conventional processes of which compare each individual pixel contained on a display.

Further, in some cases large portions of the screen may never be used for rendering, i.e. the object may be small and centrally located in the screen. In this case refresh logic can detect the condition where the status word za was set to a negative number (logically cleared) and insert the background color for those pixels. Therefore, those areas of the z buffer which are not used and correspond to portions of the screen for which no scene is displayed, are never actually reset or updated, thus saving additional time when rendering objects on a screen.

Although certain preferred embodiments have been shown and described, it should be understood that many changes and modifications may be made therein without departing from the scope of the appended claims.

What is claimed is:

1. A method of displaying objects on a computer graphics system having a display with at least one block of pixels, said block including at least two pixels therein, comprising the steps of:

displaying, by the pixels within said block, at least a portion of a first object;

storing a maximum depth value for the block of pixels displaying the first object;

computing a single depth value for a second object to be displayed by at least one pixel in said block; and determining, in one comparison only between said maximum depth value and said single depth value, whether all the pixels in the block will continue to display the first object.

2. A method according to claim 1 wherein said step of determining further comprises the step of bypassing consideration of the entire block, when drawing the second object, if said one depth value is greater than said maximum depth value.

3. A method according to claim 2 wherein said step of computing one depth value comprises the steps of:

calculating a rate of change of depth values for pixels representing the second object;

determining whether the rate of change of depth values is positive or negative;

for a positive rate of change, setting said one depth value equal to the depth value of a first pixel;

for a negative rate of change, setting said one depth value equal to the depth value of the first pixel plus the number of pixels in said block, multiplied by the rate of change.

4. A method according to claim 3 wherein said step of storing comprises the step of storing the maximum depth value of any pixel in said block.

5. A method according to claim 4 further comprising the step of comparing depth values at each pixel in said block for the first object and second object when said maximum depth value is greater than said one depth value.

6. A method according to claim 5 wherein said step of drawing comprises the steps of:

writing a frame buffer with said first object color for pixels corresponding to said first object; and writing said frame buffer with a background color for any remaining pixels in said block.

7. A method according to claim 6 further comprising the step of storing said maximum depth value and said one depth value in memory.

8. A system for displaying objects on a computer having a display with at least one block of pixels, said block including at least two pixels therein, comprising:

means for displaying at least a portion of a first object by the pixels within said block;

means for storing a maximum depth value for the block of pixels displaying the first object;

means for computing a single depth value for a second object to be displayed by at least one pixel in said block; and means for determining, in one comparison only between said maximum depth value and said single depth value, whether all the pixels in the block will continue to display the first object.

9. A system according to claim 8 wherein said means for determining further comprises means for bypassing consideration of the entire block, when drawing the second object, if said one depth value is greater than said maximum depth value.

10. A system according to claim 9 wherein said means for computing comprises:

means for calculating a rate of change of depth values for pixels representing the second object;

means for determining whether the rate of change of depth values is positive or negative;

means for setting said one depth value equal to the depth value of a first pixel when said rate of change is positive;

means for setting said one depth value equal to the depth value of the first pixel plus the number of pixels in said block, multiplied by the rate of change when said rate of change is negative.

11. A system according to claim 10 wherein said means for storing comprises stores the maximum depth value of any pixel in said block.

12. A system according to claim 11 further comprising means for comparing depth values at each pixel in said block for the first object and second object when said maximum depth value is greater than said one depth value.

13. A system according to claim 12 wherein said means for drawing comprises:

means for writing a frame buffer with said first object color for pixels corresponding to said first object; and means for writing said frame buffer with a background color any remaining pixels in said block.

14. A system according to claim 13 further comprising memory means for storing said maximum depth value and said one depth value.

* * * * *